Patented Nov. 8, 1932

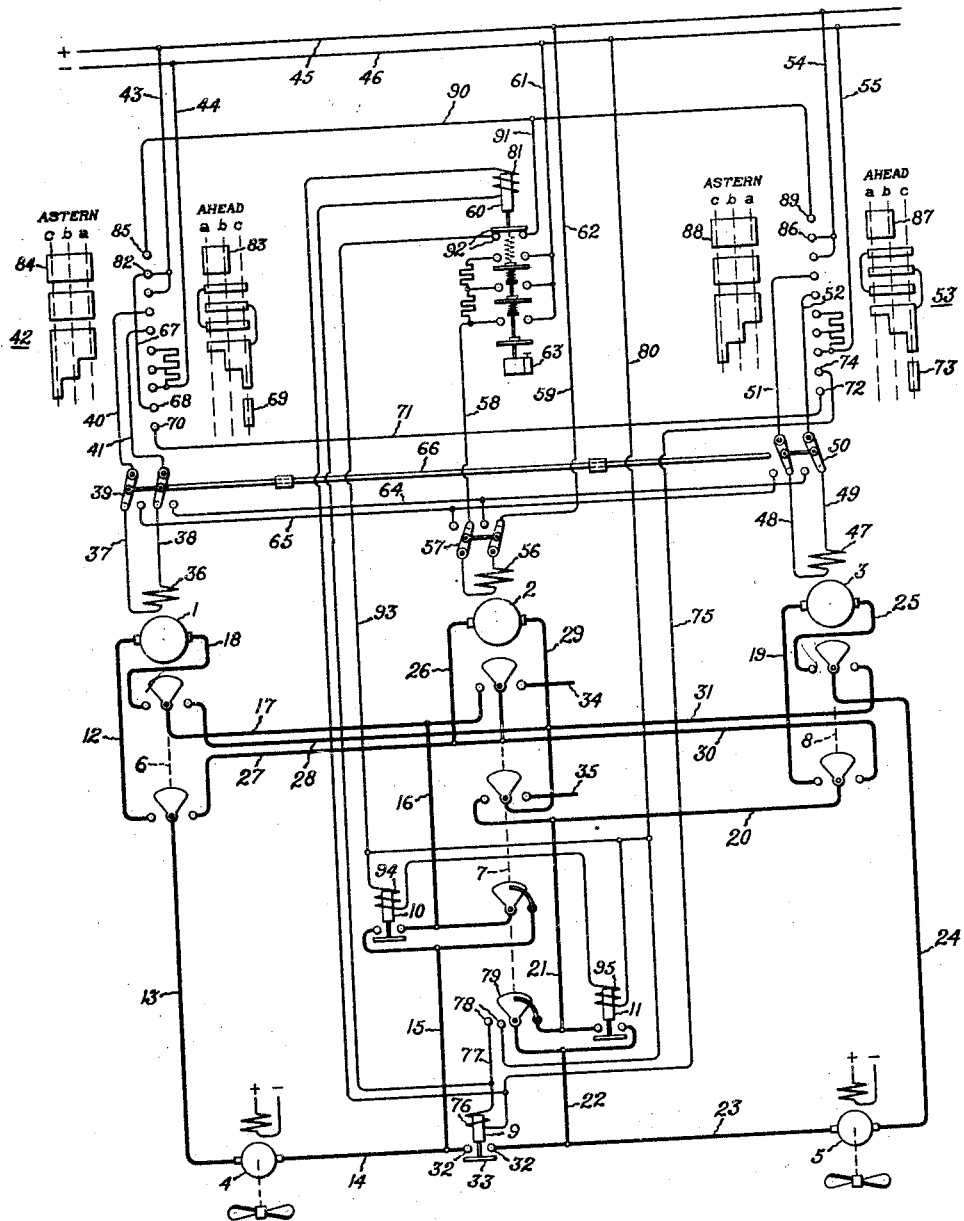

1,886,625

UNITED STATES PATENT OFFICE

ROYCE A. BEEKMAN, OF SCHENECTADY, NEW YORK, ASSIGNOR TO GENERAL ELECTRIC COMPANY, A CORPORATION OF NEW YORK

POWER PLANT

Application filed July 24, 1931. Serial No. 552,941.

My invention relates to power plants and more particularly to propulsion plants for ships having more than one propeller in which a number of generators not a multiple of the number of propellers may be employed for propelling the ship.

Because of its simplicity and dependability it is desirable to use on board ship the variable voltage, or so-called Ward-Leonard control. With the ordinary arrangements heretofore employed in systems where the number of generators is not a multiple of the number of propellers, it has not been possible without unduly complicating the system, or rendering it expensive, to have all of the generators available for all the propellers and yet have complete independent control of the propellers during maneuvering or reversal.

It is an object of my invention to provide a simple, inexpensive system involving a number of generators which is not a multiple of the number of propellers in which variable generator voltage control is available for maneuvering purposes and in which the total power of the several generators is available for full speed operation.

It is a further object of my invention to provide a system in which means are provided for independently connecting to each of the propeller motors an equal number of generators whose voltage may be suitably controlled to vary the speed and direction of rotation of the motors during maneuvering or reversal and in which all the generators in the system may be connected in the power circuit including the propeller motors.

It is a further object of my invention to provide in such a system means for connecting in series with the reversible variable voltage generators and the propeller motors the remaining generators when the reversible variable voltage generators are operating at full field for generating voltage with the same polarity as the voltage generated by the remaining generators.

It is a further object of my invention to provide in such a system means for independently connecting an equal number of the reversible variable voltage generators to each of the propeller motors for maneuvering operations when the excitation of one of them is reduced below a predetermined value.

My invention will be better understood from a consideration of a particular embodiment thereof such as illustrated in the accompanying drawing which diagrammatically represents a ship propulsion system for a twin propeller ship provided with three generators.

In the drawing only the generators 1, 2, and 3 of the prime mover generator units have been shown. Preferably each generator is independently driven by a suitable engine but more than one generator may be driven by one engine without departing from my invention. Steam or Diesel engines may be employed. The generators 1, 2, and 3 may be connected to the propeller motors 4 and 5 through selector switches 6, 7, and 8 and contactors 9, 10, and 11.

With switch 7 in the position illustrated in the drawing, generator 1 may be connected to motor 4 by throwing switch 6 to the left. This completes a circuit through conductors 12, 13, 14, 15, 16, 17, and 18. In like manner generator 3 may be connected to motor 5 by throwing switch 8 to the left. This completes a circuit through the following conductors, 19, 20, 21, 22, 23, 24, and 25. If for any reason generator 1 or its connected prime mover should fail, generator 2 may be connected to motor 4 by throwing switch 6 to the right. This completes a circuit through the following conductors, 26, 27, 13, 14, 15, 16, 17, 28, and 29. Upon failure of generator 3 or its prime mover, generator 2 may be connected to motor 5 by throwing switch 8 to the right. This completes a circuit through the following conductors 26, 30, 20, 21, 22, 23, 24, 31, and 29. With switches 6, 7 and 8 in their left-hand positions, generator 2 may be inserted in an uncompleted series circuit with generators 1 and 3 and motors 4 and 5 by throwing switch 7 to the left. The series circuit is completed by the closing of contactor 9. The circuit includes the following connections, from generator 1 through conductor 12, switch 6, conductor 13, motor 4, conductor 14, contacts 32 and 33 of contactor 9, conductor 23, motor 5, conductor 24, switch 8, conductor 25, generator 3, conductor 19, switch 8, conductor 20, switch 7, conductor 29, generator 2, conductor 26, switch 7, conductor 17, switch 6, and conductor 18 to generator 1. Contactors 10 and 11 complete independently of switch 7 circuits between generator 1 and motor 4, and generator 3 and motor 5. The circuits between generator 1 and motor 4 and generator 3 and motor 5 are the same as have been previously traced with the exception that the circuit is completed through the contacts of contactors 10 and 11 instead of through the contacts of switch 7. Generator 2 may be connected to auxiliary power buses 34 and 35 by throwing switch 7 to the right.

Generators 1 and 3 are each provided with reversible variable voltage control by means of which the generator voltage may be varied and/or reversed. The field 36 of generator 1 is connected through conductors 37 and 38, switch 39, conductors 40 and 41, controller 42, and conductors 43 and 44 to buses 45 and 46. By operating controller 42 to the left, the generator voltage is increased in the proper direction for ahead operation of the boat. By operating the controller to the right, the generator voltage is increased in the proper direction for a stern operation of the boat. Field 47 of generator 3 is connected through conductors 48 and 49, switch 50, conductors 51 and 52, controller 53, and conductors 54 and 55 to buses 45 and 46. By operating controller 53 to the left, the excitation of generator 3 is controlled for ahead operation, and by operating the controller to the right, the voltage is reversed and controlled for stern operation. Field 56 of generator 2 is connected through switch 57, conductors 58 and 59, the three lower contacts of automatic switch 60, and conductors 61 and 62 to buses 45 and 46. Automatic switch 60 operates solely to increase the excitation of generator 2 from zero to its operating value, the speed of increase being determined by the setting of dash pot or time delay device 63 associated therewith.

Upon failure of generators 1 or 3, however, field 56 of generator 2 may be connected to the controllers 42 or 53 by properly operating switches 39, 57, and 50. Upon failure of generator 1, field 56 is connected to controller 42 by operating switch 39 to the right and switch 57 to the left. The circuit is from field 56 through switch 57, transfer buses 64 and 65, and switch 39. With switch 39 in its right-hand position, switch 50 cannot be thrown to its left-hand position for connecting controller 53 to field 56 because of the position of the interlocking bar 66. In like manner, when controller 53 is connected to field 56 of generator 2 through the operation of switches 57 and 50, it is not possible to connect controller 42 to field 56 of generator 2 by reason of the position of the interlocking bar 66.

With the above preliminary description of the system, the system as a whole and its operation may best be understood by consideration of its operation.

When going in or out of a port, generator 1 will be assigned to motor 4 and generator 3 will be assigned to motor 5 by throwing switches 6 and 8 to their left-hand positions. The operation of these switches to these positions completes the circuits between these machines above traced. By means of varying the voltage of generator 1 through the operation of the controller 42 and by means of varying the voltage of generator 3 through the operation of controller 53, the speed and direction of motors 4 and 5 are completely under the control of the operating force. Inasmuch as during maneuvering through congested waters a high torque is the principal requirement, the power available from one prime mover per propeller is ample. During this period of operation switch 7 may be in its illustrated position or thrown to the right to connect generator 2 to auxiliary buses 34, 35 and contactors 9, 10, and 11 are deenergized and in their illustrated positions. Contactors are, therefore, not depended upon for ordinary control, and the power circuits between the generators and motors are not opened or in any manner controlled. This adds greatly to the simplicity and dependability of the system.

When the ship has reached open water and is ready to speed up to a point where additional power is required, generator 2 is inserted in the above described uncompleted series circuit by means of throwing its switch 7 to the left. This is done by the engineer in the engine room and is, therefore, under his control as to the selection of time and place for performing this function. The series circuit is completed by the contactor 9, provided controller 42 for generator 1 and controller 53 for generator 3 are both in their full speed ahead positions c. The energization of contactor 9 is controlled by segments on controllers 42 and 53 which complete the energizing circuit of contactor 9 when these controllers are on their full speed ahead position. The circuit is as follows: From bus 45 through conductors 43 and 67; contact 68, segment 69 and contacts 70 of controller 42; conductor 71; contact 72, segment 73 and contact 74 of controller 53; conductor 75; coil 76 of contactor 9; conductor 77; contacts 78 and blade 79 of switch 7 and conductor 80 to bus 46. At the same time coil 81 of automatic switch 60, which is connected in parallel with coil 76 of conductor 9, is excited, gradually applying excitation to the generator 2 by connecting its field 56 through the circuit above described to the buses 45 and 46. Although the excitation of generator 2 is gradually increased by means of the automatic switch 60, it is to be understood that the excitation may be applied in a single step. This is possible due to the inherent time lag in the building up a field. Thus, with the controllers 42 and 53 in their full speed ahead position and switch 7 thrown to its left-hand position, generators 1, 2, and 3 are connected in a series circuit with motors 4 and 5.

If either of the controllers 42 or 53 is moved from its full speed ahead position contactor 9 and automatic switch 60 are deenergized through the opening of their circuit by segments 69 and 73 of these controllers. As soon as the automatic switch 60 returns to its deenergized position illustrated in the drawing, decreasing the excitation of generator 2 to zero, an operating circuit is completed for the contactors 10 and 11 as follows provided controllers 42 and 53 are in an operating position other than full speed ahead position. From bus 45 through conductor 43; contact 82, segments 83 or 84, and contact 85 of controller 42; or from bus 45 through conductor 54; contact 86, segments 87 or 88, and contact 89 of controller 53; and conductors 90 and 91; contacts 92 of automatic switch 60; conductor 93; operating coils 94 and 95 of contacts 10 and 11 and conductor 80 to bus 46. The closing of contactor 10 completes a circuit between generator 1 and motor 4 independently of the switch 7, and the closing of contactor 11 completes a circuit between generator 3 and motor 5 independently of switch 7. Thus when either of the controllers 42 or 53 is moved from its full speed ahead position for maneuvering or reversal a connection is provided between the generators 1 and 3 and their motors 4 and 5 independently of the generator 2 and independent control for each propeller is again provided for emergency operation even after generator 2 has been placed in circuit through operation of its switch 7. As soon as the controllers 42 and 53 are both again in their full speed ahead position the contactor 9 and automatic switch 60 are again energized and contactors 10 and 11 deenergized to complete the full power operating circuit of the system.

Although I have described and illustrated an embodiment of my invention in which three generators and two motors have been employed, it is to be understood that my invention is not limited to such a system, but is generally applicable to systems in which the number of generators is not a multiple to the number of propellers employed for driving the ship. For example, five generators may be employed, in which case two generators may be connected to each of the propelling motors for maneuvering or reversing. A simplified arrangement has been shown in order to facilitate describing my invention, and it is to be understood that various modifications may be made without departing from my invention.

What I claim as new and desire to secure by Letters Patent of the United States, is:

1. A power plant comprising a plurality of motors, a plurality of generators not a multiple of the number of said motors, means for reversing and varying the voltage of a number of said generators which is a multiple of the number of said motors, means for independently connecting to each of said motors at least one of said reversible variable voltage controlled generators and means for connecting all of said generators to said motors only when said reversible variable voltage controlled generators are operating with full field.

2. A power plant comprising a plurality of motors, a plurality of generators not a multiple of the number of said motors, means for reversing and varying the voltage of a number of said generators which is a multiple of the number of said motors, means for independently connecting in series with each of said motors at least one of said reversible variable voltage controlled generators and means for connecting all of said generators in series with all of said motors only when said reversible variable voltage controlled generators are operating with full field for generating voltage of the same polarity as the voltage generated by said remaining generators.

3. A power plant comprising a plurality of motors, a plurality of generators not a multiple of the number of said motors, means for reversing and controlling the voltage of a number of said generators which is a multiple of the number of said motors, means for connecting at least one of said reversible variable voltage controlled generators to each of said motors, and means for connecting all of said generators in series with all of said motors and for applying excitation to the remaining generators only when said reversible variable voltage controlled generators are operating with full field for generating voltage of the same polarity as the voltage generated by said remaining generators.

4. In a power system wherein a plurality of motors are employed for supplying power to a plurality of load devices and in which a plurality of generators not a multiple of the number of motors is available for supplying power to said motors, means for reversing and varying the voltage of a number of said generators which is a multiple of the number of said motors, means for connecting all of said generators in series with each other and with said motors, and means or interrupting said series connection and for independently connecting at least one of said reversible variable voltage controlled generators to each of said motors only when the excitation of either of said reversible variable voltage controlled generators is reduced below a predetermined value.

5. A power system comprising a plurality of motors, a plurality of generators not a multiple of the number of said motors, means for reversing and varying the voltage of a plurality of said generators which is a multiple of the number of said motors, means for independently connecting to each of said motors an equal number of said reversible variable voltage controlled generators and means for connecting all of said generators in series with one another and with said motors and for applying excitation to said generators not provided with reversible variable voltage control only when said generators so provided are operating with a predetermined excitation for generating voltage of the same polarity as the voltage generated by said generators not provided with reversible variable voltage control.

6. A power system comprising a plurality of motors, a plurality of generators not a multiple of the number of said motors, reversible variable voltage controllers for a plurality of said generators which is a multiple of the number of said motors, selector switches for connecting all of said generators in an uncompleted series circuit with each other and said motors, a contactor for completing said series circuit, and means for energizing said contactor and for exciting said remaining generators only when said reversible variable voltage controllers are in a predetermined position and said selector switches are set for connecting said remaining generators in circuit with said motors.

7. A power system comprising a plurality of motors, a plurality of generators greater in number than the number of said motors, reversible variable voltage controllers for a plurality of said generators equal in number to a multiple of said motors, selector switches for connecting all of said generators in an uncompleted series circuit with each other and said motors, a contactor for completing said series circuit, contactors for completing circuits between said reversible variable voltage controlled generators and said motors independently of said selector switches, means for closing said contactor for completing said series circuit and for exciting said generators not provided with reversible variable voltage control when said reversible variable voltage controllers are in a predetermined position and said selector switches are set for connecting said remaining generators in circuit with said motors and for deenergizing said contactor and removing excitation from said generators not provided with reversible variable voltage control when said controllers have moved from said predetermined position, and means for closing said contactors for completing circuits between said reversible variable voltage controlled generators and said motors when the excitation of said generators not provided with reversible variable voltage control has been reduced to zero.

In witness whereof, I have hereunto set my hand.

ROYCE A. BEEKMAN.